(12) United States Patent
Fimpel et al.

(10) Patent No.: US 11,518,284 B2
(45) Date of Patent: Dec. 6, 2022

(54) SUPPORT FOR A HEADREST, HEADREST AND SEAT

(71) Applicant: Adient Engineering and IP GmbH, Burscheid (DE)

(72) Inventors: Michael Fimpel, Remseck am Neckar (DE); Robert Schuele, Leonberg (DE)

(73) Assignee: Adient US LLC, Plymouth, MI (US)

(*) Notice: Subject to any disclaimer, the term of this patent is extended or adjusted under 35 U.S.C. 154(b) by 0 days.

(21) Appl. No.: 17/277,756

(22) PCT Filed: Sep. 23, 2019

(86) PCT No.: PCT/EP2019/075467
§ 371 (c)(1),
(2) Date: Mar. 19, 2021

(87) PCT Pub. No.: WO2020/058523
PCT Pub. Date: Mar. 26, 2020

(65) Prior Publication Data
US 2022/0118896 A1    Apr. 21, 2022

(30) Foreign Application Priority Data

Sep. 21, 2018 (DE) ...................... 10 2018 216 177.1
Dec. 21, 2018 (DE) ...................... 10 2018 222 808.6

(51) Int. Cl.
*B60N 2/838* (2018.01)
*B60N 2/865* (2018.01)
(Continued)

(52) U.S. Cl.
CPC ............. *B60N 2/853* (2018.02); *B60N 2/818* (2018.02); *B60N 2/829* (2018.02); *B60N 2/865* (2018.02); *B60N 2002/924* (2018.02)

(58) Field of Classification Search
CPC ........ B60N 2/818; B60N 2/829; B60N 2/838; B60N 2/853; B60N 2/865
(Continued)

(56) References Cited

U.S. PATENT DOCUMENTS 4,778,218 A * 10/1988 Suman ................... B60N 2/838
                                                            297/409
5,011,225 A *  4/1991 Nemoto ................. B60N 2/853
                                                            297/408 X
(Continued)

FOREIGN PATENT DOCUMENTS

CN        103963677 A    8/2014
CN        107206919 A    9/2017
(Continued)

OTHER PUBLICATIONS

European Patent Office, International Search Report and Written Opinion in Application PCT/EP2019/075467, dated Dec. 3, 2019, 11 pages, Rijswijk, Netherlands.
(Continued)

*Primary Examiner* — Rodney B White
(74) *Attorney, Agent, or Firm* — Marshall & Melhorn, LLC

(57) ABSTRACT

A support for a headrest may have a single-part bending joint support which may have two support regions. A first support region may be situated in a backrest, and a second support region may be designed to receive a headrest body. Also included is a headrest for a seat, including a vehicle seat, that may have at least one headrest body and a support mentioned above and a seat.

12 Claims, 12 Drawing Sheets

(51) Int. Cl.
*B60N 2/853* (2018.01)
*B60N 2/829* (2018.01)
*B60N 2/818* (2018.01)
*B60N 2/90* (2018.01)

(58) Field of Classification Search
USPC .................................................. 297/408
See application file for complete search history.

(56) References Cited

U.S. PATENT DOCUMENTS

| | | | | |
|---|---|---|---|---|
| 5,052,754 | A * | 10/1991 | Chinomi | B60N 2/838 |
| | | | | 297/408 X |
| 5,145,233 | A * | 9/1992 | Nagashima | B60N 2/874 |
| | | | | 297/403 |
| 6,024,406 | A * | 2/2000 | Charras | B60N 2/853 |
| | | | | 297/472 |
| 6,082,817 | A * | 7/2000 | Muller | B60N 2/1842 |
| | | | | 297/216.12 |
| 9,061,616 | B2 * | 6/2015 | Kondrad | B60N 2/862 |
| 2002/0079732 | A1 * | 6/2002 | Saberan | B60N 2/856 |
| | | | | 297/408 |
| 2002/0195846 | A1 * | 12/2002 | Masuda | B60N 2/888 |
| | | | | 297/216.12 |
| 2006/0012226 | A1 * | 1/2006 | Schafer | B60N 2/0276 |
| | | | | 297/216.12 |
| 2006/0226689 | A1 * | 10/2006 | Linnenbrink | B60N 2/874 |
| | | | | 297/408 |
| 2011/0101762 | A1 * | 5/2011 | Lutzka | B60N 2/844 |
| | | | | 297/408 |
| 2011/0198908 | A1 * | 8/2011 | Keller | B60N 2/865 |
| | | | | 297/391 |
| 2014/0203611 | A1 * | 7/2014 | Kondrad | B60N 2/862 |
| | | | | 297/408 X |
| 2015/0130248 | A1 * | 5/2015 | Line | B60N 2/821 |
| | | | | 297/410 |
| 2015/0375649 | A1 * | 12/2015 | Jeong | A47C 7/38 |
| | | | | 297/391 |
| 2015/0375650 | A1 * | 12/2015 | Talamonti | B60N 2/853 |
| | | | | 297/408 X |
| 2017/0151896 | A1 * | 6/2017 | Switalski | B60N 2/847 |
| 2018/0042383 | A1 * | 2/2018 | Jeong | B60N 2/847 |
| 2018/0222367 | A1 * | 8/2018 | Ogawa | B60N 2/80 |
| 2019/0061585 | A1 * | 2/2019 | Nakamura | B60N 2/853 |
| 2019/0118687 | A1 * | 4/2019 | Jeong | B60N 2/856 |
| 2019/0168649 | A1 * | 6/2019 | Watson | B60N 2/853 |
| 2019/0344695 | A1 * | 11/2019 | Jeong | B60N 2/841 |
| 2019/0359105 | A1 * | 11/2019 | Kondo | B60N 2/885 |
| 2020/0031263 | A1 * | 1/2020 | Jeong | B60N 2/856 |

FOREIGN PATENT DOCUMENTS

| | | |
|---|---|---|
| CN | 207523515 U * | 6/2018 |
| CN | 109421567 A | 3/2019 |
| DE | 69602992 T2 | 1/2000 |
| DE | 10054826 A1 | 5/2002 |
| DE | 10202598 A1 | 8/2003 |
| DE | 202006004905 U1 | 7/2007 |
| DE | 10214200996 A1 | 7/2014 |
| DE | 102015201232 A1 | 7/2016 |
| DE | 102016220880 A1 | 4/2018 |
| EP | 3372445 A1 | 9/2018 |
| KR | 20150005773 A | 1/2015 |

OTHER PUBLICATIONS

China National Intellectual Property Administration, Office Action in Application No. 201980061463.X dated Jul. 7, 2022, 7 pages.

* cited by examiner

SUPPORT FOR A HEADREST, HEADREST AND SEAT

FIELD

The invention relates to an adjustable carrier for a headrest and to a headrest having a headrest body and such a carrier. Furthermore, the invention relates to a seat, in particular a vehicle seat.

BACKGROUND

Adjustable headrests are well known. Headrests are for example adjustable in height or inclination. To this end, the headrests usually comprise a pad carrier having a pad, which can be fastened thereto, for the head to rest against, and two supporting rods or a supporting bracket for fastening to a backrest of a seat.

For example, DE 102 02 598 B4 discloses a headrest having a main carrier and an impact element that is attached to the main carrier in an articulated manner and is movable relative thereto. The impact element is movable manually between different settings.

SUMMARY

The object of the present invention is to specify a carrier and an adjusting mechanism for a headrest, which is of simple construction, is convenient to adjust and has a small adjustment space. A further object of the invention is to specify an improved headrest that has few parts and is convenient to adjust.

The object in relation to the carrier for the headrest, the headrest, and the seat, is achieved by the features of the claims.

Developments of the invention are the subject matter of the dependent claims.

The carrier according to the invention for a headrest comprises a one-piece bending joint carrier for forming two carrier regions. In particular, the bending joint carrier is a one-piece carrier element for receiving a headrest body and to be received in a backrest. The one-piece bending joint carrier comprises a first carrier region, in particular a joint region, which is arrangeable in a backrest. Furthermore, the one-piece bending joint carrier comprises a second carrier region, in particular a joint region, which is configured to receive a headrest body.

The advantage achieved by the invention is that of allowing a reduction in components and individual carrier parts without reducing load-bearing strength, robustness, integrity and comfort for a user. In particular, as a result of the configuration of the one-piece bending joint carrier, complicated and time-consuming assembly processes are reduced. A parts list can thus be shortened. In particular, material costs and assembly costs are reduced. Furthermore, a simple modular design is allowed through the use of a bending joint carrier formed in one piece and the subsequent attachment of the headrest body, and a backrest-side arrangement.

Furthermore, the one-piece bending joint carrier is configured so as to be optimized in terms of installation space. As a result of the omission of a plurality of individual components for forming for example a headrest adjusting mechanism or the carrier, more installation space can be created within the headrest and the backrest. This results in particular in what is known as package optimization, wherein installation space within the headrest and the backrest can be maximized. The bending joint carrier comprises an integrated adjusting mechanism formed in one piece therewith. As a result, the first carrier region and the second carrier region are configured in particular in a narrow manner. The maximized installation space is usable for example for integrating components such as audio components, video components, air-conditioning components, storage space options and further functions. In particular, components that are integrated in the dashboard or instrument panel in conventional vehicles can be installed in the headrest and/or in the backrest. In particular, the bending joint carrier is configured as a supporting structure.

According to one development, the one-piece bending joint carrier is formed from a plurality of coupling links, wherein a bending joint is arranged in each case between two coupling links. For example, the bending joint carrier comprises five coupling links and four bending joints. Furthermore, it is possible to form the one-piece bending joint carrier from two, three, four or more than five coupling links. All the coupling links are connected together in each case by a bending joint. In particular, the coupling links and the bending joints are formed in one piece. The coupling links are oriented with respect to one another via the bending joints such that the bending joint carrier forms a kinematic chain.

For better understanding: In a state of the bending joint carrier in which it has been manufactured but not yet formed into the carrier, the coupling links are arranged substantially next to one another, for example in plan view or side view of the bending joint carrier. The bending joint carrier thus forms a chain of coupling links arranged next to one another, wherein, by bending the bending joints or pivot joint elements, the respective coupling links can be oriented with respect to one another in order to form the carrier. The bending joint carrier comprises a coupling link arranged terminally, in particular on the front side, at one end of the chain and a coupling link arranged terminally, in particular on the front side, at the other end of the chain. The terminally arranged coupling links are spaced apart from one another and are arranged at opposite ends of the chain, wherein the two terminally arranged coupling links are also referred to below as terminal coupling links. Furthermore, the bending joint carrier comprises a centrally arranged coupling link, which is referred to below as central coupling link, and in each case one coupling link that is arranged between the central coupling link and one of the terminal coupling links. The coupling links arranged in each case between the central coupling link and one of the terminal coupling links are referred to below as intermediate coupling links. This results in a total of five coupling links. In this case, the terminal coupling links are each unattached on one of their sides.

In a state of the bending joint carrier in which it has been formed into the carrier, the central coupling link is configured to connect the carrier regions together in an integrated manner. The central coupling link is configured for example as a connecting coupling link that connects the first and the second carrier region together in an integral manner. In this case, the central coupling link is both part of the first carrier region and part of the second carrier region, wherein the central coupling link is arranged on the backrest side and at the same time forms a supporting structure for the headrest body. In particular, the central coupling link has the greatest length compared with the respective lengths of the other coupling links.

In a state of the bending joint carrier in which it has been formed into the carrier, the terminal coupling links have been brought together and coupled to one another in an articulated manner in the region of the central coupling link. In particular, the unattached sides of the terminal coupling links are brought together and connected to one another in an articulated manner. This region of the central coupling link is referred to below as attachment region. For example, the terminal coupling links are connected or coupled to one another in an articulated manner via a fastening element, for example in the form of a bolt or pin, and fastened to the central coupling link in a movable manner.

For example, the central coupling link has at least one slotted guide in the form of an elongate slot in the region of the brought-together terminal coupling links. For example, a turning and sliding joint is formed in the attachment region. The fastening element is configured to carry out a sliding movement along the slotted guide, in particular the elongate slot, and as a result to initiate a turning movement about an axis of rotation, defined by the fastening element, of the terminal coupling links. In other words, the fastening element is held in a movable manner in the slotted guide. In particular, an X-adjustment and an inclination adjustment of the bending joint carrier and thus of the headrest are initiated as a result. For example, an adjusting device, such as a detent, for incrementally adjusting the headrest is arranged in the attachment region. For example, the adjusting device comprises a step switching mechanism or a ratchet-type lock.

In particular, the bending joint carrier comprises a coupling link in the form of a mount, which is arranged fixedly on the backrest side. All the other coupling links are configured to be movable relative to one another and to the coupling link in the form of a mount. For example, one of the intermediate coupling links, which is arranged between the central coupling link and one of the terminal coupling links, forms a mount of the bending joint carrier.

In one development, the adjustment is driven electrically. For example, a drive unit is arranged in the bending joint carrier. The drive unit is connected at one end to one of the terminal coupling links and at the other end to one of the intermediate coupling links in the form of a mount. Alternatively or additionally, the drive unit is coupled to the terminal coupling link and the backrest, for example a backrest frame. For example, the drive unit is a cylinder drive, such as a hydraulically operated cylinder, or some other electric or electromechanical drive unit. As a result of the movement of the terminal coupling link, adjustment of the further coupling links coupled thereto in terms of movement is initiated. The bending joints each have to carry out only small angular movements.

For height adjustment of the bending joint carrier, an adjusting device, in particular a drive unit, for example a cylinder drive, is arranged for example in the first carrier region. The adjusting device is fastened for example on the backrest side and connected to the intermediate coupling link in the form of a mount. Via displacement of the intermediate coupling link in the form of a mount in the upward direction, in particular in the Z direction, the bending joint carrier is height-adjustable.

For example, the bending joint carrier is a one-piece bent sheet-metal part. The bending joints are formed for example by a thinning of material between the respective coupling links. The coupling links are configured in particular in the form of sheet-metal profile elements. For example, the bent sheet-metal part is produced or producible by means of a known manufacturing process, for example forming, and optionally by means of further cutting processes. Alternatively, the bending joint carrier is a one-piece plastics part. For example, the plastics part is produced or producible by means of what is known as a one-component or two-component process. For example, the coupling links are formed from a hard material, in particular a hard plastic. The bending joints are formed in particular from a soft material, in particular a soft plastic, such as synthetic rubber, for example ethylene-propylene-diene rubber. For example, the carrier element is an injection-molded plastics part. For example, the injection-molded part is producible by means of multi-component injection molding. Other manufacturing processes, in particular primary forming processes, are usable to form the coupling links and the bending joints connected thereto in one piece. The bending joint carrier in the form of a bent sheet-metal part or of a plastics part is bent in each case at the provided bending joints in order to orient the coupling links. A first number of the coupling links are oriented with respect to one another such that they form the first carrier region. A second number of the coupling links are oriented with respect to one another such that they form the second carrier region. In particular, the coupling links are oriented with respect to one another and the bending joints are formed so as to ensure load distribution over the attachment region. The bending joints are furthermore flexible up to a predefined degree of bending.

In one possible development, the one-piece bending joint carrier is in the form of a multi-way joint carrier. The one-piece bending joint carrier is configured to be adjusted in at least two degrees of freedom. In particular, the one-piece bending joint carrier comprises a multi-bar linkage mechanism. The bending joints are configured to each be adjusted in one degree of freedom. In other words: The multi-way joint carrier has an integrated multi-bar linkage mechanism, the joints of which are in the form of bending joints. The multi-way joint carrier is in this case a carrier element for the headrest and a mechanism for adjusting the headrest in at least two or more degrees of freedom in one. For example, the bending joint carrier is configured to be movable toward the user or away from the user in a longitudinal orientation and in an inclination direction. In particular, the coupling links are connected to one another in a movable manner via the respective bending joints. Adjustment of the bending joint carrier runs smoothly. The coupling links are coupled in terms of movement, in particular coupled to one another in an articulated manner.

Kinematics of the headrest are formed by the coupling links and bending joints and chosen such that the coupling links and bending joints only have to make small angular movements. As a result, all the coupling links and the bending joints can be produced together as one part. The coupling links are at the same time carrier elements and in particular supporting elements of the headrest. In particular, an adjusting mechanism of the bending joint carrier is in the form of a multi-bar linkage mechanism, the joints of which are in the form of bending joints. The multi-bar linkage mechanism is, as described above, formed from coupling links and bending joints. The headrest follows the movement of the head, including inclination, in particular during X adjustment. The movements of the coupling links are forced.

According to a further embodiment, a number of the coupling links are provided with and reinforced by stiffening elements, such as steel inserts or other stiffening elements. For example, such stiffening elements are used when height adjustment of the headrest, in particular in the Z direction of the seat, is intended to be integrated in addition to the already provided longitudinal adjustment, in particular in the X direction of the seat. The one-piece bending joint carrier is provided for example to form a 4-way headrest. As a result of the configuration of the bending joints, longitudinal adjustment, i.e. in the direction of a head or in the direction away from the head, is already integrated. It is possible to omit stiffening elements when the bending joint carrier is intended to be adjusted only in a longitudinal orientation.

Furthermore, the invention relates to a headrest, which comprises a headrest body and a one-piece carrier in the form of a bending joint carrier, which is formed in one piece with the adjusting mechanism.

In one development, the one-piece bending joint carrier comprises a plurality of bending joints, which are configured each to perform a predefined angular movement in order to adjust the bending joint carrier in at least two degrees of freedom. It is also possible for pivot joint elements to be used as bending joints.

The advantage achieved by the invention is in particular that such a one-piece bending joint carrier or such an integrated adjusting mechanism having bending joints, for example material rotary joints, flexible bending joints, in particular plastics bending joints or leaf-spring joints, allows convenient multi-way adjustment of the headrest, has a restricted adjustment angle, is maintenance-free, requires no lubrication, and has simplified assembly that is optimized in terms of installation space. In particular as a result of the convenient adjustment with small angular movements, the bending joint carrier bolsters the neck of a user of the headrest. Such a bending joint carrier having an integrated multi-bar linkage mechanism is particularly narrow and thin in particular in the backrest-side carrier region.

In particular, the bending joint carrier is designed to be adjusted in at least two degrees of freedom. In other words: The bending joint carrier is designed to adjust the headrest in at least two degrees of freedom, for example in the longitudinal orientation and in the inclination or rotation direction. In particular, the bending joints are configured in a flexible manner, in particular in a reversibly flexible manner. If a force is exerted on the headrest, for example by the user leaning against it or in the event of an accident, the bending joint carrier yields up to a certain degree, and then follows a movement of the back of the head and supports the latter.

In addition, the simple adjusting mechanism in the form of a multi-bar linkage mechanism results in no loss of installation space and therefore in maximum installation space for integrating various components in the headrest and/or in the backrest.

In a further configuration, the bending joint carrier comprises a plurality of bending joints or pivot joint elements and at least one turning and sliding joint element. For example, the turning and sliding joint element is arranged largely in a lower region, in particular substantially beneath a center or a central axis of the headrest. This avoids the arrangement of a relatively high-up drive unit in the headrest and achieves a low center of gravity of the headrest.

The bending joint carrier forms, in a state in which it has been formed into the carrier, a closed, in particular a closed-loop branched, kinematic chain. The bending joint carrier is for example a plastics part formed in one piece or a bent sheet-metal part formed in one piece.

Furthermore, the invention relates to a seat, in particular a vehicle seat, comprising at least a backrest, a headrest held on the backrest, and a carrier for fastening the headrest to the backrest. In this case, a first carrier region of the carrier is arranged inside the backrest. A second carrier region of the carrier is arranged outside, for example above, the backrest and is provided with a headrest body of the headrest.

DESCRIPTION OF THE FIGURES

Exemplary embodiments of the invention are explained in more detail with reference to drawings, in which.

DESCRIPTION

Mutually corresponding parts are provided with the same reference signs in all the figures.

Figure 1A:
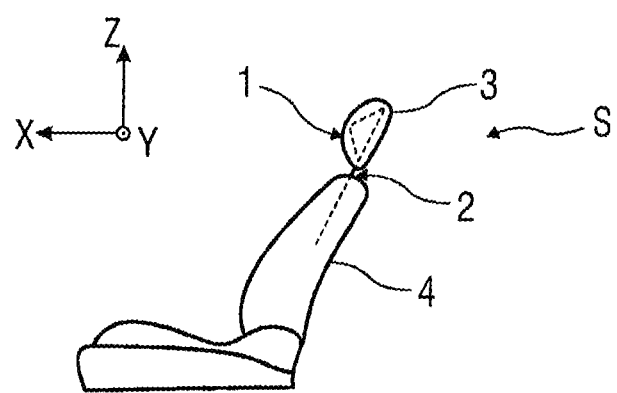
FIG. 1A schematically shows a side view of one embodiment of a seat having a movable headrest, FIGS. 1B and 1C schematically show side views of embodiments of a carrier for the headrest, wherein the carrier comprises a one-piece bending joint carrier with two carrier regions, FIG. 1D schematically shows an embodiment of an injection-molding tool for producing a bending joint carrier in the form of a plastics part, FIG. 1E schematically shows a side view of a further embodiment of the carrier according to FIG. 1B, FIGS. 2A and 2B schematically show side views of embodiments of a headrest having a carrier, which is held in a backrest, FIG. 2C schematically shows a cross-sectional illustration of the carrier according to FIGS. 2A and 2B, FIG. 2D schematically shows an exploded illustration of the carrier according to FIGS. 2A and 2B, FIGS. 3A and 3B schematically show side views of enlarged illustrations of a second carrier region of the carrier, FIG. 4 schematically shows a side view of one embodiment of the carrier having a number of drive units, and FIG. 5 schematically shows a side view of adjusting movements of the carrier with in particular small angular movements.

FIG. 1A schematically shows a side view of a seat S, in particular a vehicle seat.

For better understanding, a coordinate system is shown in each case in the figures, wherein the coordinate system comprises a longitudinal axis X, a transverse axis Y, and a vertical axis Z with respect to the seat S, wherein the longitudinal axis X corresponds to a longitudinal orientation, the transverse axis Y corresponds to a transverse orientation, and the vertical axis Z corresponds to a vertical orientation of the seat S. The seat S is arranged for example in a vehicle (not illustrated in more detail).

The seat S comprises a headrest 1, which is arranged in a movable manner on a backrest 4 of the seat S. The headrest 1 comprises a headrest body 3 and a carrier 2. The carrier 2 is configured to hold the headrest body 3 on the backrest 4. In particular, the carrier 2 is configured to hold the headrest body 3 in a movable manner on the backrest 4. The headrest body 3 is for example an impact element and/or pad element.

The carrier 2 is designed for example to move the headrest body 3 at least in the longitudinal orientation, wherein, in addition, a slight pivoting movement of the headrest body 3 takes place. Optionally in addition, the carrier 2 is designed to move the headrest body 3 in the vertical orientation. In particular, the carrier 2 is configured such that comfort and safety for a user of the seat S are increased.

Figure 1B:
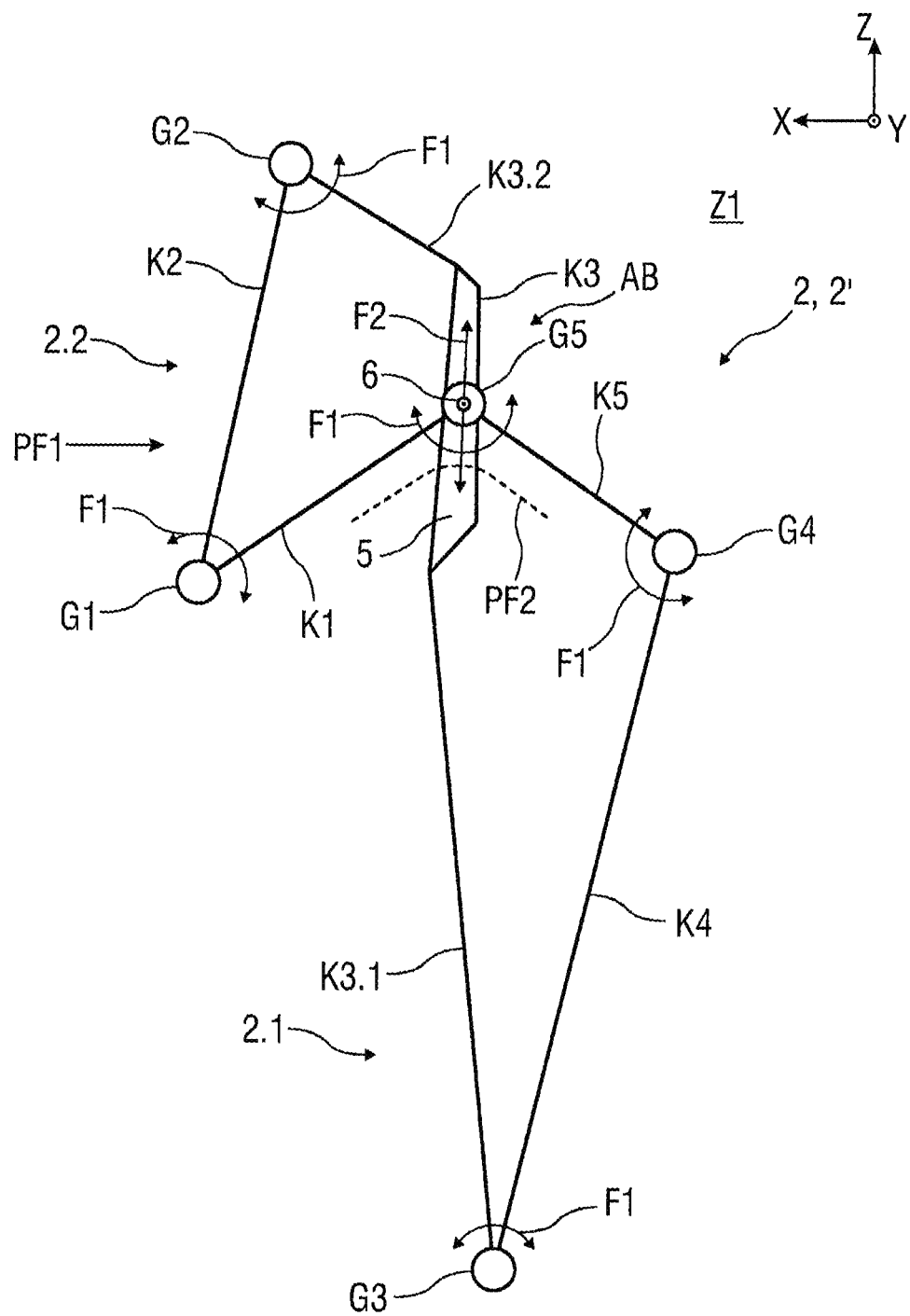

FIG. 1B shows a side view of one embodiment of the carrier 2 for the headrest 1, wherein the entire carrier 2 is formed from a one-piece bending joint carrier 2'. The bending joint carrier 2' comprises two carrier regions 2.1, 2.2. Here, FIG. 1B shows a one-piece bending joint carrier 2' formed into the carrier 2, and in particular, FIG. 1B shows the bending joint carrier 2' in a state Z1 in which it has been formed into the carrier 2.

Figure 1C:
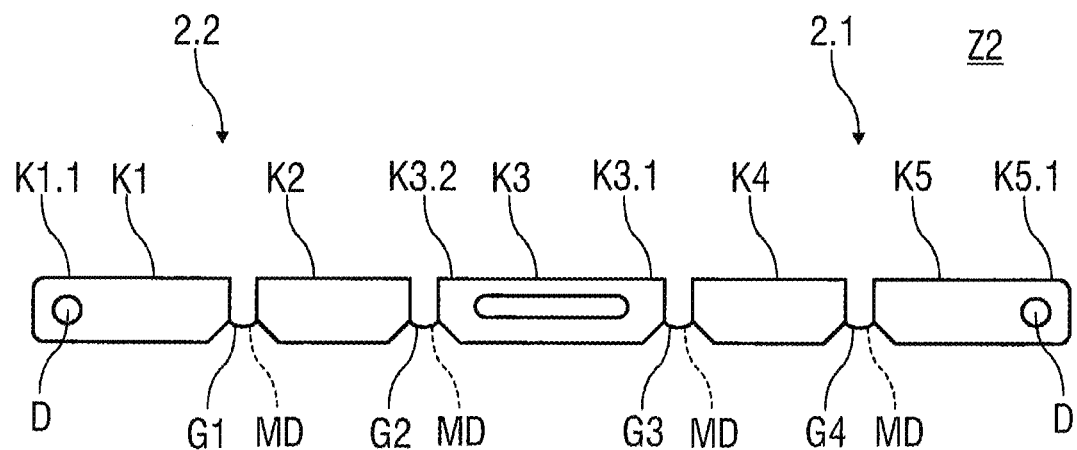

FIG. 1C shows a side view of an embodiment of the bending joint carrier 2' in a state Z2 in which it has been manufactured but not yet formed into the carrier 2.

The one-piece bending joint carrier 2' comprises a first carrier region 2.1, in particular a lower carrier region 2.1, which is configured to be received in the backrest 4. Furthermore, the one-piece bending joint carrier 2' comprises a second carrier region 2.2, in particular an upper carrier region 2.2, which is configured to receive the headrest body 3. The lower and upper carrier regions 2.1 and 2.2 are operatively connected or operatively coupled to one another. The lower carrier region 2.1 is arranged at least partially in a backrest 4. The upper carrier region 2.2 projects from a top side of the backrest 4. In other words, the upper carrier region 2.2 is arranged entirely outside the backrest 4.

The one-piece bending joint carrier 2' is formed from a plurality of coupling links K1 to K5. The coupling links K1 to K5 are oriented with respect to one another such that the bending joint carrier 2' forms the two carrier regions 2.1, 2.2 for the headrest 1. Furthermore, the one-piece bending joint carrier 2' comprises a plurality of bending joints G1 to G4. A bending joint G1 to G4 is arranged in each case between two coupling links K1 and K2, K2 and K3, K3 and K4, K4 and K5. The bending joints G1 to G4 are configured in a flexible manner. In other words: The carrier 2 is formed from coupling links K1 to K5 that are interlinked with one another via the bending joints G1 to G4. Such interlinking of coupling links K1 to K5 allows, for example, a simple and cost-effective configuration of the carrier 2. The coupling links K1 to K5 are oriented for example relative to one another. The orientation of the coupling links K1 to K5 is effected for example by bending the bending joints G1 to G4.

In an alternative embodiment (not illustrated in more detail) of the one-piece bending joint carrier 2', it is possible to form the one-piece bending joint carrier 2' from at least two coupling links, for example from the coupling links K3 and K4. In one development, the one-piece bending joint carrier 2' is formed from three coupling links, for example from the coupling links K3, K4 and K5 or K1, K2 and K3. It should be understood that the number of coupling links K1 to K5 and of bending joints G1 to G4 can vary depending on the configuration of the headrest 1 and/or backrest 4.

The respective carrier region 2.1, 2.2 is in particular a carrier and joint region.

In particular, the bending joint carrier 2' is in the form of a multi-bar linkage mechanism. The coupling links K1 to K5 are coupled to one another in an articulated manner, in particular coupled in terms of movement, via the respective bending joints G1 to G4. A bending movement of one of the bending joints G1 to G4 is able to initiate a movement of the respective coupling links K1 to K5 and vice versa. If one of the coupling links K1 to K5 moves, bending of the respective bending joint G1 to G4 is able to be initiated. The multi-bar linkage mechanism is designed to transmit a movement and forces associated therewith and to drive the coupling links K1 to K5. In particular, the bending joint carrier 2' comprises a kinematic chain. In other words: The coupling links K1 to K5 and the bending joints G1 to G4 are designed to form a kinematic chain. In particular, the bending joints G1 to G4 are configured each to be adjusted in one degree of freedom F1, as shown in FIG. 1B. With regard to the coupling links K1 to K5, a movement of the bending joints G1 to G4 corresponds for example to an angle closing movement, in particular an angle reducing movement, and to an angle opening movement, in particular an angle increasing movement.

Figure 1D:
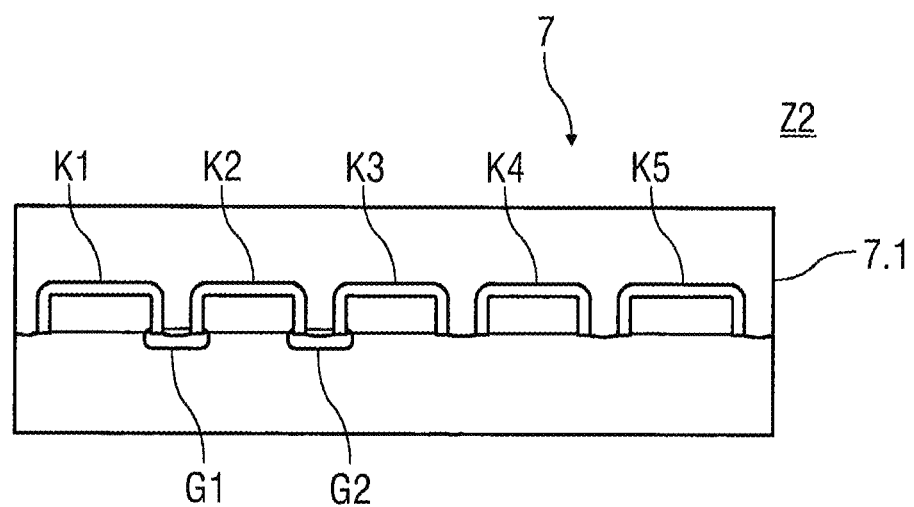

One-piece means that the coupling links K1 to K5 and the bending joints G1 to G4 are produced in one production process, as shown in FIG. 1D. After the production process, the bending joint carrier 2' is provided, in an unformed state Z2, as a one-piece component shown in FIG. 1C, wherein the bending joint carrier 2' is formed into the carrier 2 by bending the bending joints G1 to G4 and by orienting the coupling links K1 to K5 with respect to one another. In particular, in the state Z2 in which it has been manufactured but not formed into the carrier 2, the coupling links K1 to K5 are arranged next to one another in the form of a non-closed chain. The coupling links K1 to K5 are in the form of supporting and carrier elements of the headrest 1. For example, the bending joint carrier 2' is a bent sheet-metal part, wherein the bending joints G1 to G4 are each formed for example by a thinning of material MD between two adjoining coupling links K1 and K2, K2 and K3, K3 and K4, K4 and K5. Alternatively, the bending joint carrier 2' is a plastics part. The coupling links K1 to K5 are formed for example from a hard material, in particular a hard plastic. The bending joints G1 to G4 are formed in particular from a soft, flexible material, in particular a soft plastic, for example ethylene-propylene-diene rubber.

The bending joint carrier 2' comprises two terminal coupling links K1 and K5. Furthermore, the bending joint carrier 2' comprises a central coupling link K3. Furthermore, the bending joint carrier 2' comprises two intermediate coupling links K2 and K4, wherein one of the intermediate coupling links K2 or K4 is arranged in each case between the central coupling link K3 and one of the two terminal coupling links K1 or K5. In the exemplary embodiment illustrated, the intermediate coupling link K2 is arranged between the central coupling link K3 and the terminal coupling link K1. The intermediate coupling link K4 is arranged between the central coupling link K3 and the terminal coupling link K5. The central coupling link K3 forms the longest link. In particular, the central coupling link K3 is configured as a connecting coupling link and designed to connect the first carrier region 2.1 and the second carrier region 2.2 to one another in an integrated manner. A lower part K3.1 of the central coupling link K3 is arranged on the backrest side in the backrest 4 and an upper part K3.2 of the central coupling link K3 is arranged on the headrest side. In the state Z2 of the bending joint carrier 2' in which it has not been formed into the carrier 2, the terminal coupling links K1 and K5 each have an unattached side K1.1, K5.1.

The intermediate coupling link K4 is in the form of a mount of the bending joint carrier 2'. For example, the intermediate coupling link K4 is arranged fixedly, in particular in an immovable manner in the longitudinal orientation, in the backrest 4.

In the state Z1 of the bending joint carrier 2' in which it has been formed into the carrier 2, the terminal coupling links K1 and K5 have been brought together in the region of the central coupling link K3 and coupled to one another in an articulated manner. This region is referred to below as the attachment region AB. In particular, the bending joint carrier 2' formed into the carrier 2 is a closed, in particular closed-loop branched, kinematic chain.

The attachment region AB is formed by the central coupling link K3. To this end, the central coupling link K3 has at least one slotted guide 5, in particular in the form of an elongate slot. The two terminal coupling links K1, K5 each comprise mutually corresponding through-openings D. A fastening element 6 is passed, in particular plugged, through the through-openings D and the slotted guide 5. The fastening element 6 is intended to couple the respective terminal coupling links K1, K5 to one another in an articulated manner. The fastening element 6 is for example a conventional bolt or pin. The fastening element 6 in this case forms a pivot joint and in particular a sliding joint for the terminal coupling links K1, K5. In particular, a turning and sliding joint G5 is formed in the attachment region AB. The fastening element 6 is guided in a movable manner in the slotted guide 5. The fastening element 6 couples the terminal coupling links K1, K5 mechanically to one another, in particular so as to be able to turn and slide. The turning and sliding joint G5 is configured to be adjusted in two degrees of freedom F1, F2. The fastening element 6 is configured to perform a sliding movement along the slotted guide 5, in particular the elongate slot, and as a result to initiate a turning movement of the terminal coupling links K1, K5 about a pivot axis defined by the fastening element 6.

The attachment region AB is formed substantially in the second carrier region 2.2. In particular, the attachment region AB is arranged substantially in a lower region of the second carrier region 2.2. In particular, a low center of gravity in the headrest 1 is ensured. The bending joint carrier 2' is in the form of a multi-way joint carrier and comprises a multi-bar linkage mechanism. The turning and sliding joint G5 is intended to initiate an adjustment of the bending joints G1 to G4.

Forces, in particular loads, (in the direction of the arrow PF1) that act on the bending joint carrier 2', in particular on the second carrier region 2.2, are distributed in the attachment region AB by a resultant uniform movement, in particular rotation, of the terminal coupling links K1, K5. This force or load distribution is indicated by the arrow PF2.

FIG. 1D schematically shows an injection-molding tool 7 for producing a bending joint carrier 2' in the form of a plastics part. The injection-molding tool 7 is a conventional molding tool having an injection mold 7.1 that forms the bending joint carrier 2'. By way of example, the injection-molding tool 7 is configured to produce a plastics part in a 1-component or 2-component process. For example, the coupling links K1 to K5 and the bending joints G1 to G4 are produced from one material, in particular a plastics material. In the 2-component process, for example the coupling links K1 to K5 are molded from a hard material, in particular hard plastic, in a first step and subsequently the bending joints G1 to G4 are molded from a soft material, in particular synthetic rubber, between the coupling links K1 to K5 in a further step in the injection mold 7.1. After hardening, the plastics part formed in one piece is removed from the injection mold 7.1.

Figure 1E:
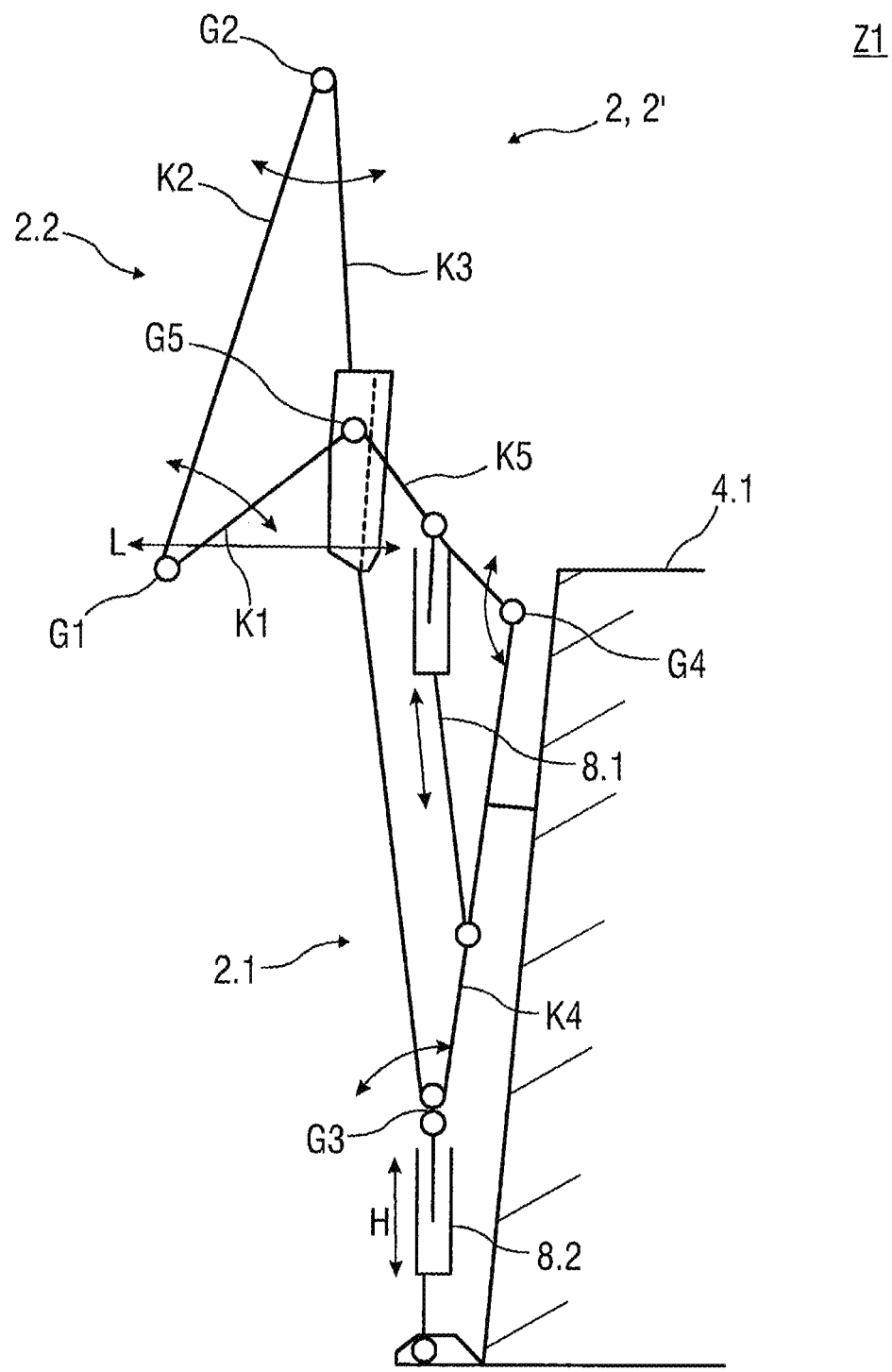

FIG. 1E schematically shows a side view of a further embodiment of the carrier 2, comprising the one-piece bending joint carrier 2' with two carrier regions 2.1, 2.2, wherein the first, in particular lower carrier region 2.1 is arranged and held in a backrest frame 4.1 of the backrest 4. Here, the intermediate coupling link K4 of the first carrier region 2.1 is arranged in the backrest frame 4.1 so as to be immovable in the longitudinal orientation, but to be movable in the vertical orientation. In particular, the carrier 2 is configured to perform a longitudinal adjustment L of the headrest body 3 by kinematically dependent movements of the bending joint carrier 2'. In order to configure the longitudinal adjustment L in an electrically actuable manner, a drive unit 8.1, for example a spindle drive or a cylinder drive, is provided. Optionally in addition, for height adjustment H of the carrier 2, a further drive unit 8.2 is provided. The drive unit 8.1 for longitudinal adjustment L of the headrest 1 acts between the intermediate coupling link K4 and the terminal coupling link K5. The drive unit 8.2 for height adjustment H acts between the first carrier region 2.1, for example in the region of the bending joint G3, and the backrest frame 4.1 or a substructure of the backrest 4.

Figure 2A:
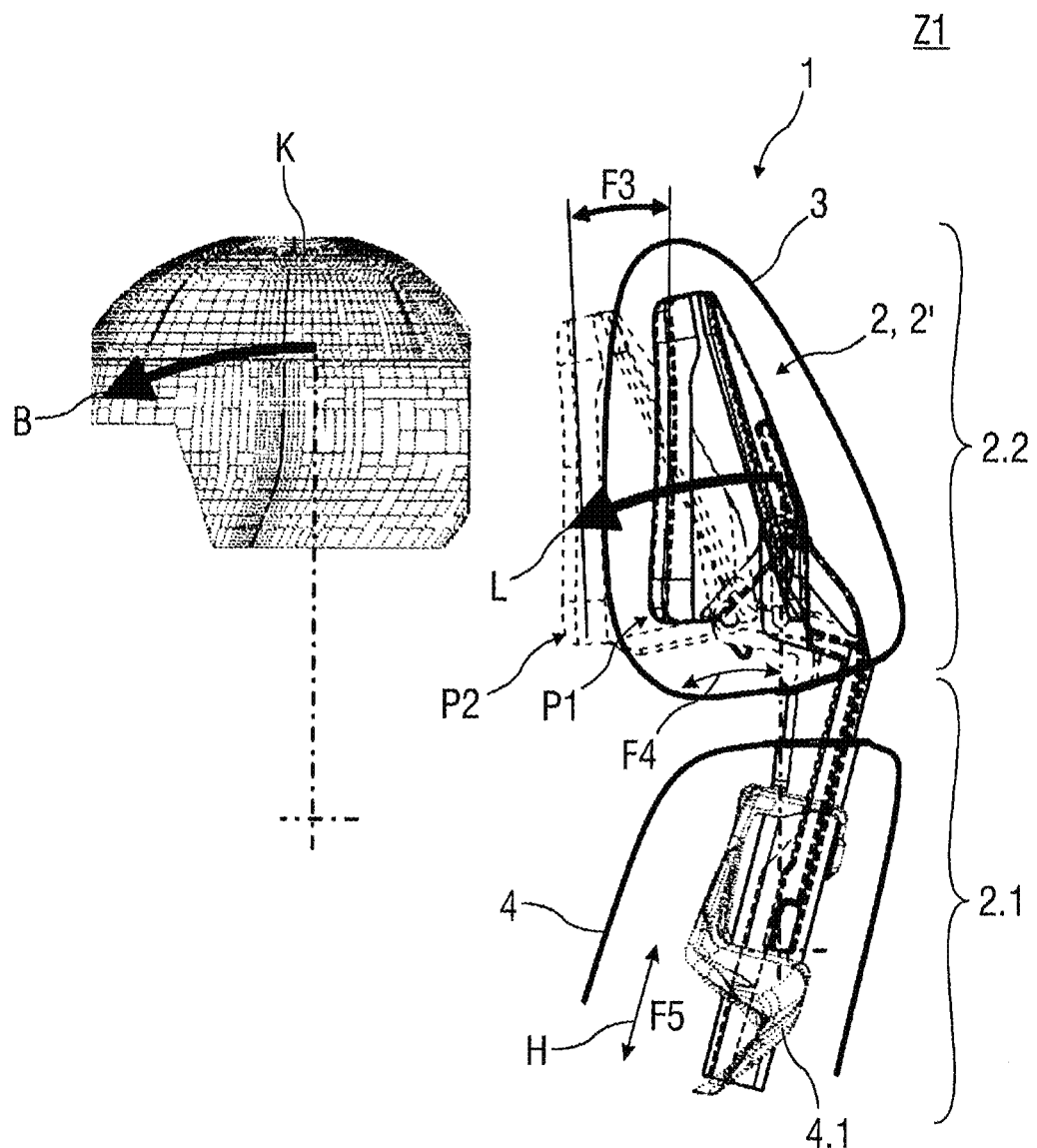
Figure 2B:
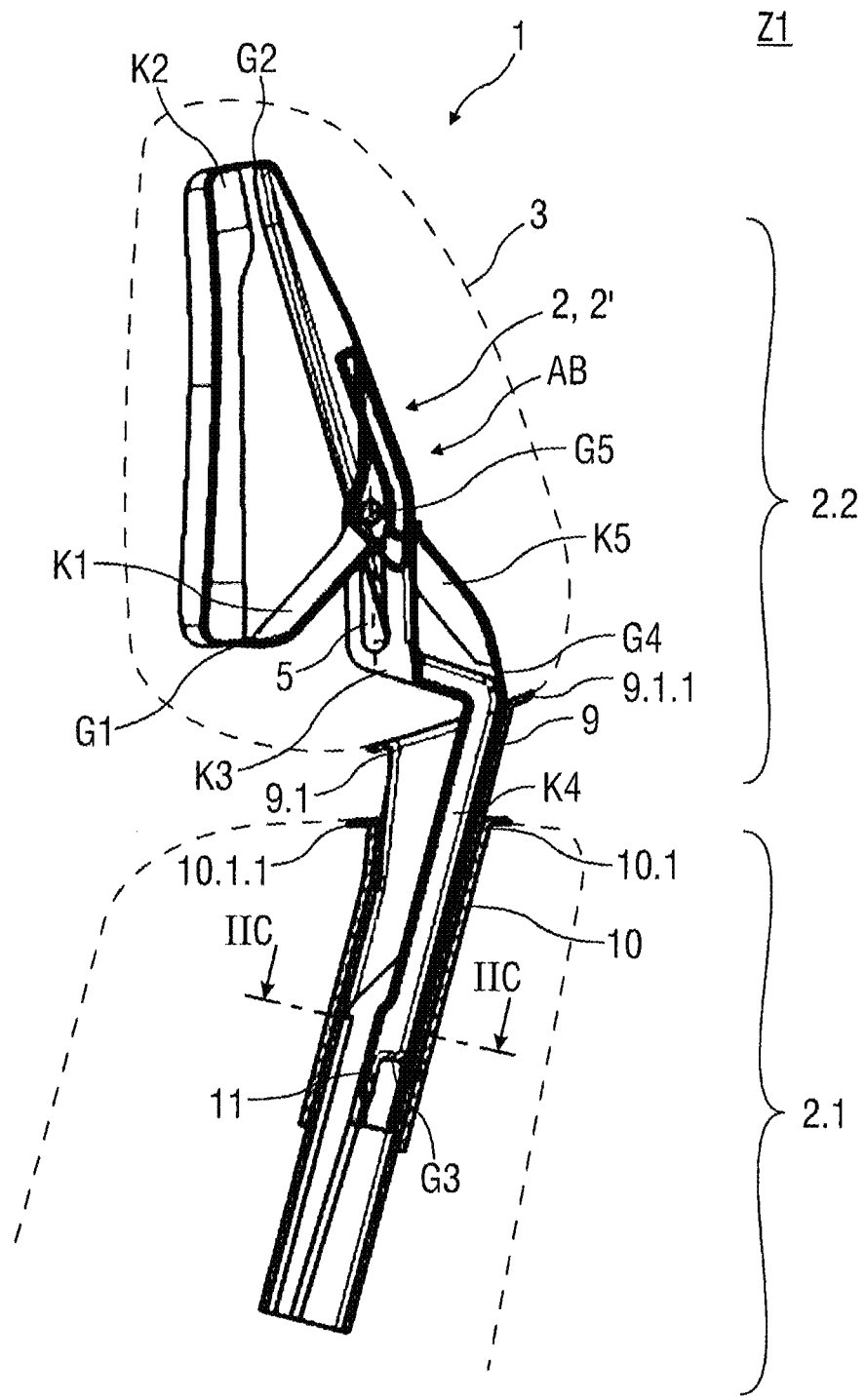

FIGS. 2A and 2B each schematically show a side view of a headrest 1 with a carrier 2, which is formed from a bending joint carrier 2' for automatic and/or manual longitudinal adjustment L in at least two degrees of freedom F3 and F4, which are shown in FIG. 2A. The degree of freedom F3 corresponds to a movement, in particular a longitudinal adjustment L, substantially parallel to the longitudinal axis X and the degree of freedom F4 corresponds to a pivoting or inclination movement. In this case, the headrest 1, in particular the headrest body 3 as resting element for a head K, follows a head movement B of a user by means of the bending joint carrier 2'. In addition, the headrest 1 can optionally be adjusted vertically in the vertical direction in a degree of freedom F5.

In particular, FIGS. 2A and 2B each show the headrest in a resting or starting position P1. Furthermore, FIG. 2A shows the headrest 1 in an adjusted position P2 moved forward in the longitudinal orientation.

The first carrier region 2.1 is held in the backrest frame 4.1 by means of a covering sleeve 9. In one possible development, the carrier 2 comprises a further covering sleeve 10, into which the covering sleeve 9 is able to be plugged and which is able to be arranged in the backrest 4. In particular, the covering sleeve 10 is arranged fixedly in the backrest 4. For example, the covering sleeve 10 is embedded in the backrest 4. The first carrier region 2.1 is inserted in the covering sleeve 9. In particular, the intermediate coupling link K4, in the form of a mount, of the first carrier region 2.1 is fixed in the covering sleeve 9. The covering sleeve 9 is thus arranged at least partially in the further covering sleeve 10. For example, the covering sleeve 9 has an upper region, which projects from a top side of the backrest 4. By way of example, the upper region of the covering sleeve 9 forms an outer connecting region between the headrest 1 and backrest 4. For height adjustment H, the covering sleeve 9 is arranged in a movable manner in the covering sleeve 10 fixed in the backrest. By way of example, the first carrier region 2.1, in particular the intermediate coupling link K4 in the form of a mount, has fixing elements 11. The covering sleeve 9 has, on its inside, mating fixing elements that correspond to the fixing elements 11. For example, the fixing elements 11 are configured in the form of stiffening elements, in particular stiffening arms or stiffening struts. The fixing elements 11 are formed in one piece with the first carrier region 2.1. The mating fixing elements are configured for example in the form of pockets in an inner wall of the covering sleeve 9. The fixing elements 11 are plugged into the mating fixing elements and locked. The covering sleeves 9 and 10 each comprise a cavity. The covering sleeve 9 is arranged in the cavity of the covering sleeve 10. In particular the carrier 2 is arranged in the cavity of the covering sleeve 9.

The covering sleeve 9 has an upper at least partially open peripheral region 9.1, through which the upper carrier region 2.2 is passed. The peripheral region 9.1 has for example a flange region 9.1.1 encircling a sleeve opening. In particular, the flange region 9.1.1 is formed toward the outside, i.e. directed away from the sleeve opening. The peripheral region 9.1 and/or flange region 9.1.1 are/is configured to carry the headrest 1, in particular the headrest body 3.

The further covering sleeve 10 has an upper open peripheral region 10.1, through which the covering sleeve 9 is passed. The peripheral region 10.1 has for example a flange region 10.1.1 encircling a sleeve opening. In particular, the flange region 10.1.1 is formed toward the outside, i.e. directed away from the sleeve opening. The peripheral region 10.1 and/or the flange region 10.1.1 corresponds to a cutout formed in the backrest 4. For example, the flange region 10.1.1 bears against a top side of the backrest 4.

Figure 2C:
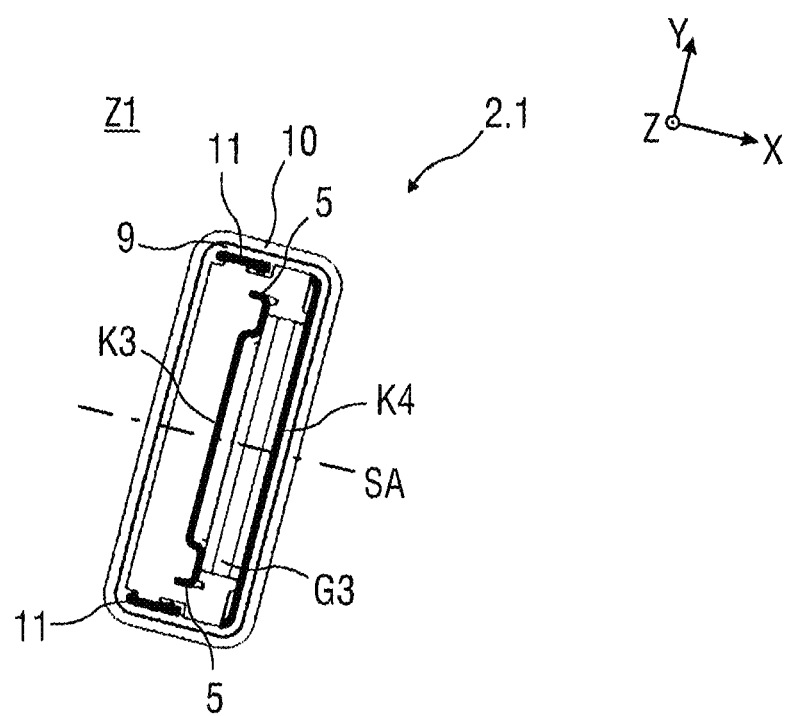

FIG. 2C shows a cross-sectional illustration of the first carrier region 2.1. In particular, the bending joint carrier 2' is formed in an axially symmetric manner with respect to the axis of symmetry SA, and in particular, the bending joint carrier 2' is formed with mirror symmetry. In this case, the central coupling link K3 has two slotted guides 5. The terminal coupling links K1, K5 of the first and second carrier region 2.1, 2.2 each have, in a manner corresponding to the slotted guides 5, two unattached sides K1.1, K5.1 in the direction of the slotted guides 5. The fastening element 6 is guided through the two slotted guides 5.

Figure 2D:
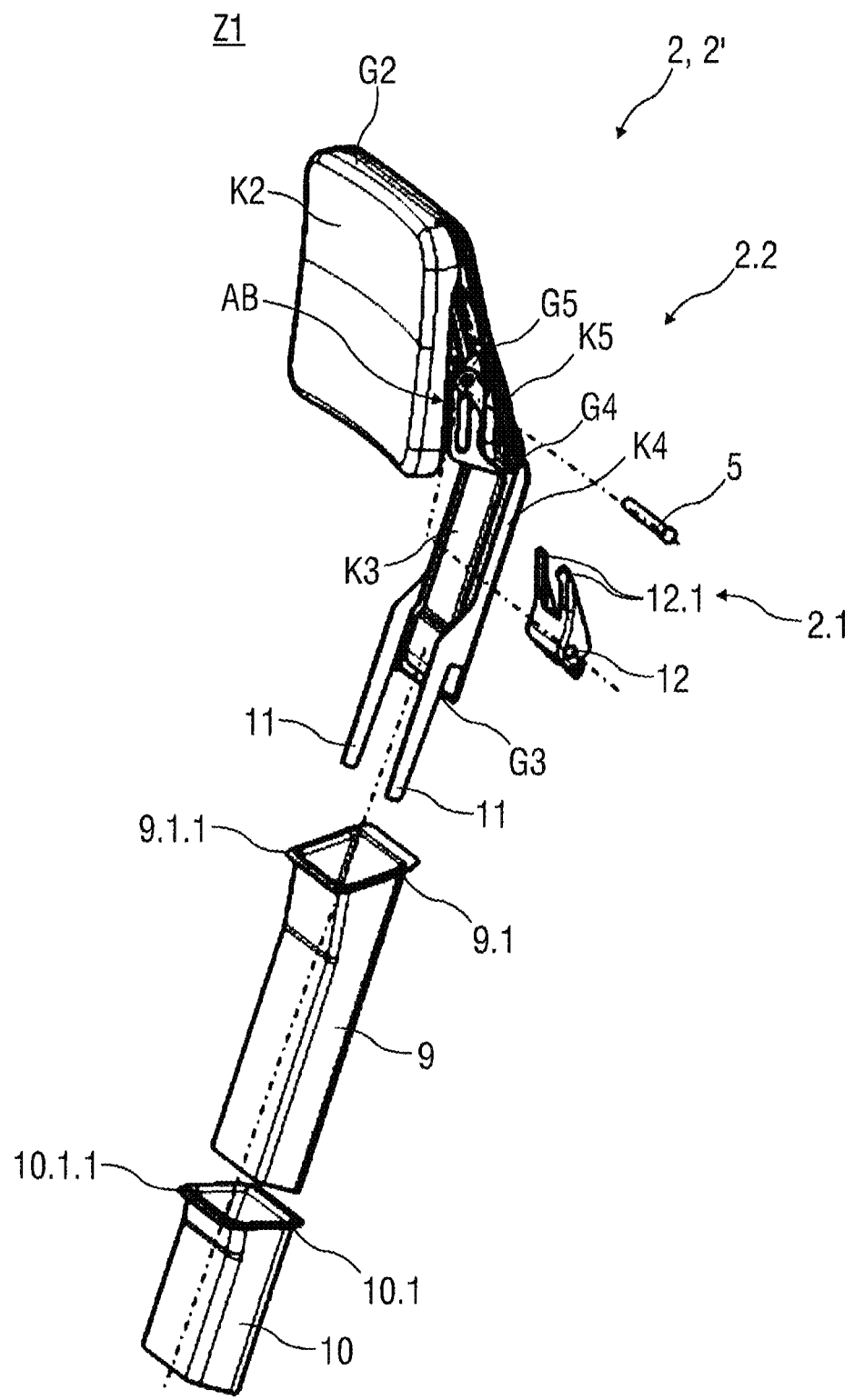
Figure 3A:
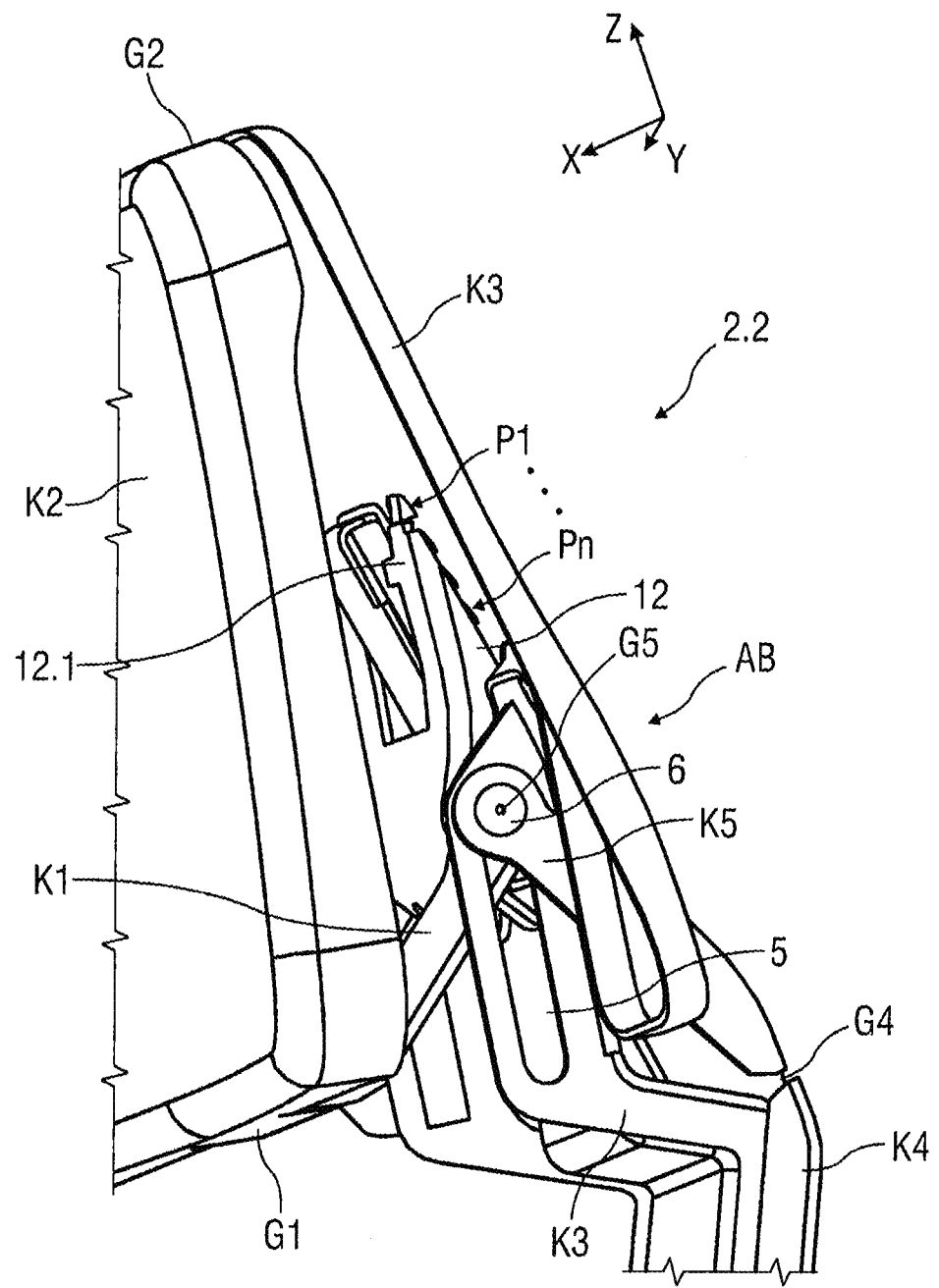
Figure 3B:
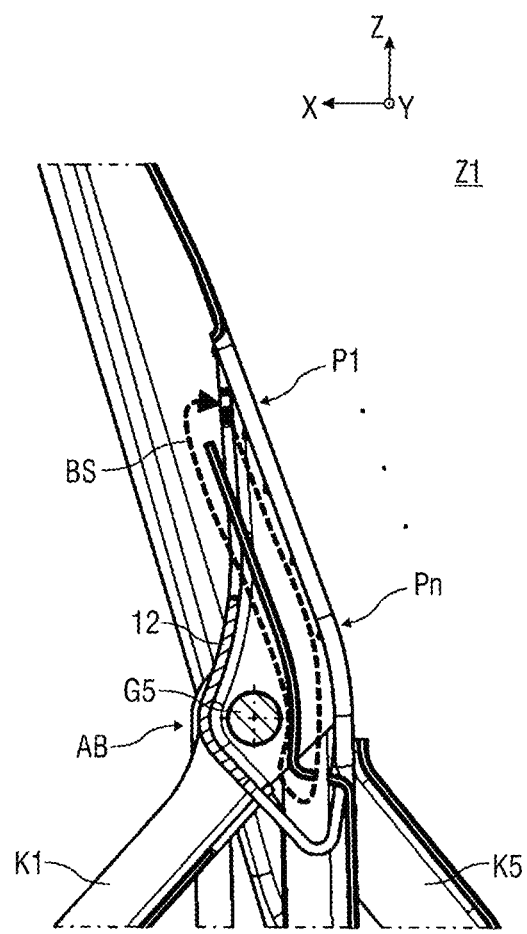
Figure 5:
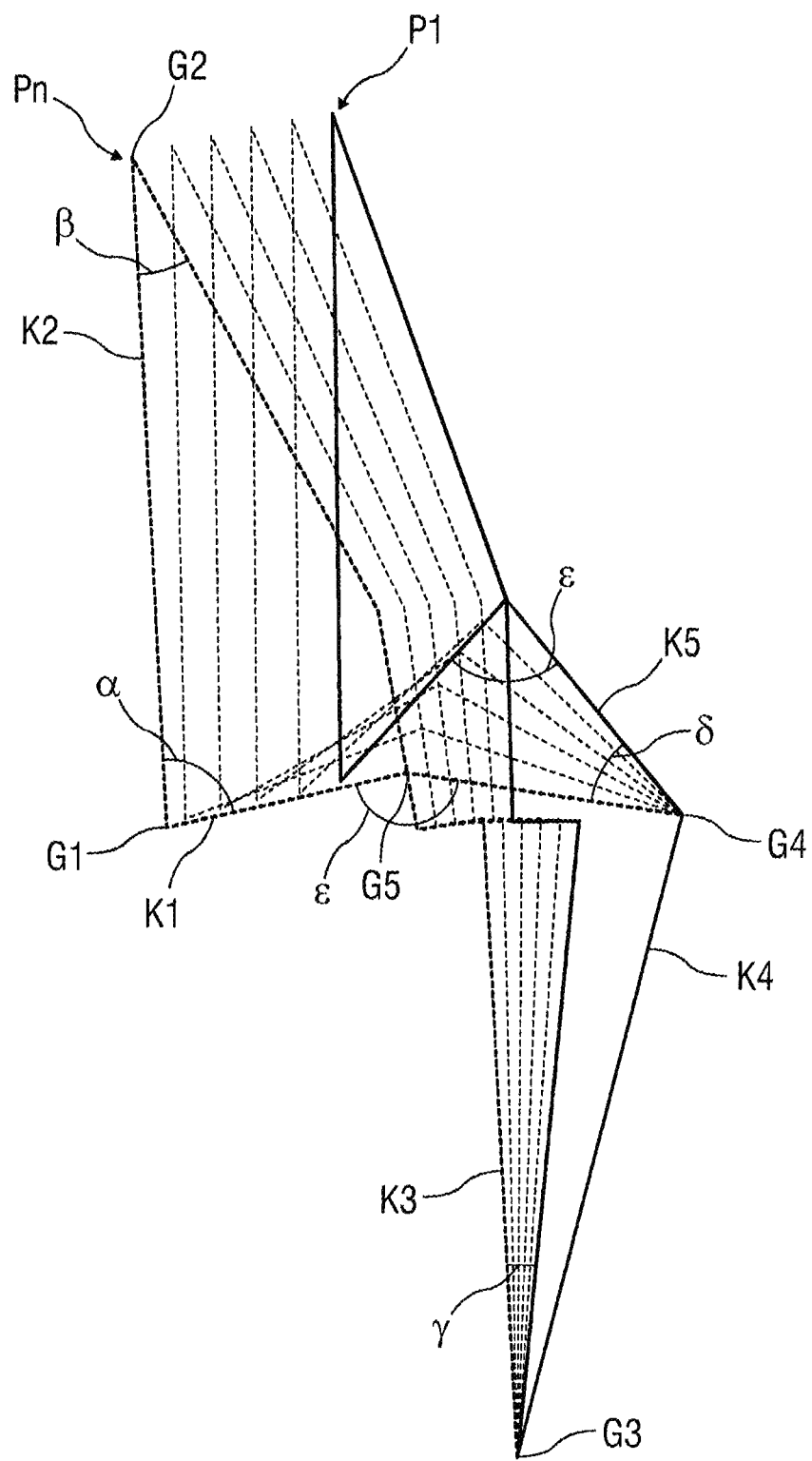

FIG. 2D schematically shows an exploded illustration of the carrier 2 according to FIGS. 2A and 2B. Arranged in the region of the turning and sliding joint G5 is an adjusting device 12, in particular in the form of a latch, for fixing the headrest 1 in one of the settable positions P1 to Pn, as shown in FIGS. 3A, 3B and 5. The adjusting device 12 is provided for example for manual adjustment of the headrest 1. The adjusting device 12 is in the form of a pawl, latching plate with latching lugs or latching protrusions 12.1. In particular, the adjusting device 12 is for example a conventional ratchet-type lock that is used for furniture.

FIGS. 3A and 3B each show schematically enlarged illustrations in the region of the turning and sliding joint G5 of the bending joint carrier 2', in particular of the second carrier region 2.2. FIG. 3B shows the closed kinematics of the multi-bar linkage mechanism and the movement cycle BS of the multi-bar linkage mechanism for adjusting and latching the headrest 1 in one of the positions P1 to Pn by means of the adjusting device 12.

Figure 4:
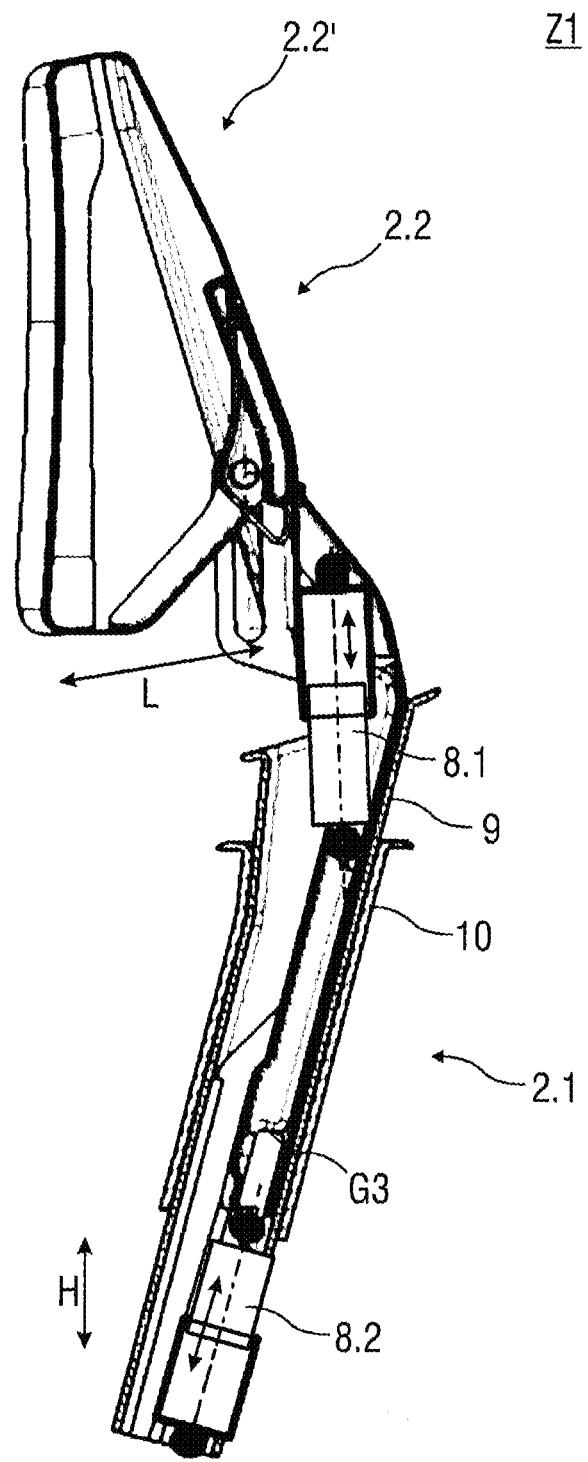

FIG. 4 schematically shows the drive units 8.1, 8.2. For example, the drive units 8.1, 8.2 are in the form of spindle drives, cylinder drives or thrust drives. The drive unit 8.2 for the electrical or electromechanical height adjustment H of the headrest 1 is arranged for example inside the covering sleeve 9. At a lower end of the drive unit 8.2, the latter is arranged on the backrest 4 in a manner fixed to the mount. At the other end of the drive unit 8.2, the latter is coupled to the first carrier region 2.1.

FIG. 5 shows the respective adjustment movements of the coupling links K1 to K5 and thus of the headrest 1 depending on a respective adjustment angle α to δ of the bending joints G1 to G4. In particular, angular movements of the bending joints G1 to G4 are relatively small. An adjustment angle ε of the turning and sliding joint G5 changes depending on the sliding movement along the slotted guide 5. The adjustment angle ε corresponds to an angular movement performed by the terminal coupling links K1, K5 with respect to one another.

LIST OF REFERENCE SIGNS

1 Headrest
2 Carrier
2' Bending joint carrier
2.1 Carrier region, in particular lower carrier region
2.2 Carrier region, in particular upper carrier region
3 Headrest body
4 Backrest
4.1 Backrest frame
5 Slotted guide
6 Fastening element
7 Injection-molding tool
7.1 Injection mold
8.1, 8.2 Drive unit
9, 10 Covering sleeve
9.1, 10.1 Peripheral region
9.1.1, 10.1.1 Flange region
11 Fixing element
12 Adjusting device
12.1 Latching protrusion
AB Attachment region
B Head movement
BS Movement cycle
D Through-opening
F1 to F5 Degree of freedom
G1 to G4 Bending joint
G5 Turning and sliding joint
H Height adjustment
K Head
K1 Coupling link, in particular terminal coupling link
K1.1 Unattached side
K2 Coupling link, in particular intermediate coupling link
K3 Coupling link, in particular central coupling link
K3.1 Lower part
K3.2 Upper part
K4 Coupling link, in particular intermediate coupling link
K5 Coupling link, in particular terminal coupling link
K5.1 Unattached side
L Longitudinal adjustment
MD Thinning of material
P1 to Pn Position
PF1, PF2 Arrow
S Seat
SA Axis of symmetry
Z1, Z2 State
X Longitudinal axis
Y Transverse axis
Z Vertical axis
α to ε Adjustment angles

What is claimed is:

1. A headrest for a vehicle seat, comprising at least one headrest body and a carrier, the carrier comprising a one-piece bending joint carrier, wherein the one-piece bending joint carrier comprises two carrier regions, wherein a first carrier region is arrangeable in a backrest and a second carrier region is configured to receive a headrest body and wherein the one-piece bending joint carrier comprises a plurality of bending joints, which are configured each to perform a predefined angular movement in order to adjust the bending joint carrier in at least two degrees of freedom, wherein the bending joints are each formed by a thinning of material between two adjacent coupling links.

2. The headrest as claimed in claim 1, wherein the one-piece bending joint carrier is formed from a plurality of coupling links, wherein a bending joint is arranged in each case between two coupling links.

3. The headrest as claimed in claim 1, wherein the one-piece bending joint carrier is in the form of a multi-bar linkage mechanism.

4. The headrest as claimed in claim 1, wherein the bending joints are configured to each be adjusted in one degree of freedom.

5. The headrest as claimed in claim 1, wherein the one-piece bending joint carrier is configured, in a state in which it has been manufactured but not yet formed into the carrier, in the form of a chain of coupling links arranged next to one another, comprising
a terminal coupling link arranged at a first end of the chain,
a terminal coupling link arranged at a second end of the chain, a central coupling link, and two intermediate coupling links, wherein an intermediate coupling link is arranged between the central coupling link and one of the terminal coupling links.

6. The headrest as claimed in claim 5, wherein the central coupling link is configured, in a state of the bending joint carrier in which it has been formed into the carrier, as a connecting coupling link that connects the carrier regions together.

7. The headrest as claimed in claim 5, wherein, in the state of the bending joint carrier in which it has been formed into the carrier, the terminal coupling links have been brought together and coupled to one another in an articulated manner in a region of the central coupling link.

8. The headrest as claimed in claim 5, wherein the terminal coupling links have been coupled to one another in an articulated manner by a fastening element in a region of the central coupling link.

9. The headrest as claimed in claim 8, wherein the central coupling link has at least one slotted guide, in which the fastening element is held in a movable manner.

10. The headrest as claimed in claim 1, wherein the one-piece bending joint carrier is a plastics part.

11. The headrest as claimed in claim 1, wherein the one-piece bending joint carrier is a bent sheet-metal part.

12. A seat, including a vehicle seat, comprising at least:

a backrest, and a headrest as claimed in claim 1, held on the backrest, wherein the first carrier region of the carrier is arranged inside the backrest, and the second carrier region is arranged outside the backrest.

\* \* \* \* \*